(12) United States Patent
Zhao et al.

(10) Patent No.: US 10,875,155 B2
(45) Date of Patent: Dec. 29, 2020

(54) UNIVERSAL FIXTURE BASED MACHINE TOOL

(71) Applicant: BEIJING LXT TECHNOLOGY CO., LTD., Beijing (CN)

(72) Inventors: Yumin Zhao, Beijing (CN); Yongyi Zhang, Beijing (CN)

(73) Assignee: BEIJING LXT TECHNOLOGY CO., LTD., Beijing (CN)

( * ) Notice: Subject to any disclaimer, the term of this patent is extended or adjusted under 35 U.S.C. 154(b) by 356 days.

(21) Appl. No.: 16/137,526

(22) Filed: Sep. 20, 2018

(65) Prior Publication Data

US 2019/0022829 A1 Jan. 24, 2019

Related U.S. Application Data

(63) Continuation of application No. PCT/CN2017/077475, filed on Mar. 21, 2017.

(30) Foreign Application Priority Data

Mar. 22, 2016 (CN) .......................... 2016 1 0157924

(51) Int. Cl.
*B25B 1/06* (2006.01)
*B23Q 37/00* (2006.01)
(Continued)

(52) U.S. Cl.
CPC .................. *B25B 1/06* (2013.01); *B23Q 1/54* (2013.01); *B23Q 3/06* (2013.01); *B23Q 37/00* (2013.01)

(58) Field of Classification Search
CPC .. B25B 1/00; B25B 1/06; B25B 11/00; B25B 11/02; B23Q 3/00; B23Q 3/06;
(Continued)

(56) References Cited

U.S. PATENT DOCUMENTS 9,272,378 B1 3/2016 Miller
9,700,976 B2 * 7/2017 Gao ........................ B23Q 1/621
(Continued)

FOREIGN PATENT DOCUMENTS

CN 102554631 A 7/2012
CN 202963524 U 6/2013
(Continued)

*Primary Examiner* — Lee D Wilson
(74) *Attorney, Agent, or Firm* — Wayne & Ken, LLC; Tony Hom

(57) ABSTRACT

Disclosed is a universal fixture based machine tool used in the machining industry. The tool includes a numerically controlled machine tool body, a multifunctional machine tool countertop, a first fixture pallet, a second fixture pallet, a fixture integration platform, a split bench vise, and a flexible fixture element. The multifunctional machine tool countertop, the first fixture pallet and the second fixture pallet are all made of perforated foundation plates. The numerically controlled machine tool body can achieve a three-axis linkage machining function of X-, Y-, and Z-coordinate moving axes. The fixture integration platform can achieve a rotary machining function of three rotation axes A, B, and C of the universal fixture based machine tool. The flexible fixture element can have various combinations and changes, so that the universal fixture based machine tool has a machining function of three increment axes U, V, and W.

18 Claims, 5 Drawing Sheets

(51) Int. Cl.
*B23Q 3/06* (2006.01)
*B23Q 1/54* (2006.01)

(58) Field of Classification Search
CPC .......... B23Q 3/02; B23Q 3/066; B23Q 3/154;
B23Q 3/152; B23P 19/00; B23P 19/04;
B23P 19/10
See application file for complete search history.

(56) References Cited

U.S. PATENT DOCUMENTS

| | | | |
|---|---|---|---|
| 10,610,990 B2* | 4/2020 | Tada | F16C 29/025 |
| 2002/0044284 A1* | 4/2002 | Webb | G01B 21/047 |
| | | | 356/399 |
| 2008/0203637 A1* | 8/2008 | Li | B25B 1/2484 |
| | | | 269/71 |
| 2019/0022829 A1* | 1/2019 | Zhao | B23Q 3/06 |

FOREIGN PATENT DOCUMENTS

| | | | |
|---|---|---|---|
| CN | 103465188 A | 12/2013 | |
| CN | 205996706 U | 3/2017 | |
| DE | 102011114693 A1 | 4/2013 | |
| EP | 1647354 A1 | 4/2006 | |

* cited by examiner

UNIVERSAL FIXTURE BASED MACHINE TOOL

CROSS-REFERENCE TO RELATED APPLICATIONS

This application is a continuation of International Application No. PCT/CN2017/077475, filed on Mar. 21, 2017 which claims the benefit of priority from Chinese Application No. 201610157924.1, filed on Mar. 22, 2016. The content of the aforementioned applications, including any intervening amendments thereto, are incorporated herein by reference.

TECHNICAL FIELD

The invention belongs to the technical field of machine cutting and machining, and particularly relates to a universal fixture based machine tool.

BACKGROUND OF THE PRESENT INVENTION

Since the advent of machine tools, machining of special-shaped parts has been a difficult problem in the machining manufacturing industry, which hasn't been solved well in decades. In the machining industry, machine tool machining equipment and work fixtures matched with the machining equipment in use fall into two different areas of specialization. Over the decades, they meet market demands independently. Usually, an enterprise needs to design and manufacture the work fixtures after purchasing the machine tool machining equipment, and this process takes 2-3 months sometimes or even half a year, resulting in delayed service of the machine tool machining equipment.

SUMMARY OF THE PRESENT INVENTION

The invention aims at providing a universal fixture based machine tool to solve the problems in the prior art described above. By means of the universal fixture based machine tool, the machine tool itself has various work fixtures and the machine tool and the work fixtures are integrated, so that the universal fixture based machine tool is formed.

To achieve the purposes above, the invention provides the following scheme: the invention provides a universal fixture based machine tool used in the machining industry, including: a three-axis linkage numerically-controlled machine tool body, a multifunctional machine tool countertop, a first fixture pallet, a second fixture pallet, a fixture integration platform, a split bench vise and a flexible fixture element. The multifunctional machine tool countertop is arranged on the numerically-controlled machine tool body. The first fixture pallet and/or the second fixture pallet are/is arranged on the multifunctional machine tool countertop. The fixture integration platform and the split bench vise are arranged on the multifunctional machine tool countertop, or the first fixture pallet, or the second fixture pallet. And the split bench vise and/or the flexible fixture element are/is arranged on the fixture integration platform.

Further, a rotary lower platen is further arranged at the bottom of the fixture integration platform. A rotary upper platen is arranged on the rotary lower platen. One side edges of the rotary lower platen and the rotary upper platen are rotatably connected through a hinge shaft, and an angle adjustment rod capable of allowing the rotary upper platen to rotate upwards around the hinge shaft is arranged on the other side edges of the rotary lower platen and the rotary upper platen.

Further, one end of the angle adjustment rod is hinged with the rotary lower platen. An angle adjustment rod handle capable of allowing the angle adjustment rod to rotate is arranged at the other end of the angle adjustment rod. The angle adjustment rod is provided with threads. The rotary upper platen is provided with a nut lantern ring fitting with the angle adjustment rod. And the nut lantern ring can rotate around a horizontal center line, parallel to the hinge shaft, of the nut lantern ring.

Further, the range of angles of the rotary upper platen rotating upwards around the hinge shaft is 0-90 degrees.

Further, an angle electronic display capable of reading an upward rotating angle is arranged on the rotary upper platen.

Further, a center axis hole is formed in a center of the rotary lower platen, and the fixture integration platform is enabled to rotate around the center axis hole by 360 degrees.

Further, a countertop and a worm handle are arranged on the rotary upper platen, and the countertop (5-02) is enabled to make 360-degree rotation by rotating the worm handle (5-09).

Further, the center line perpendicular to the countertop is equivalent to an axis A, the hinge shaft is equivalent to an axis B, the center axis hole is equivalent to an axis C, and when the three rotating axes A, B and C are linked, a composite space angular variation function can be obtained.

Further, the numerically-controlled machine tool body is a three-coordinate axis numerically-controlled machining center body, and the X axis, Y axis and Z axis are 1000 mm, 600 mm and 500 mm in travel respectively, with the precision being 0.01 mm and a tool magazine including 10 tools. And a three-axis linkage machining function of X-, Y-, and Z-coordinate moving axes can be achieved.

Further, the multifunctional machine tool countertop is provided with holes for locking fixtures. Upper half portions of the holes are cylindrical pin holes and lower half portions of the holes are screw holes. The multifunctional machine tool countertop is of a two-layer structure. Chipping discharging holes perforated in the width direction are formed in a lower layer in the length direction. And when the machine tool cuts, longer and larger waste chippings are removed from a surface of a machine tool table, and small and broken waste chippings are flushed into the 7 chipping discharging holes (2-04) in the lower layer of the countertop by cutting liquid via the holes (2-03) in the machine tool table and then are removed.

Further, the multifunctional machine tool countertop (2) is of a foundation plate structure of a perforated fixture and is 1000 mm in length and 600 mm in width. 48 rows of the holes are formed in the length direction, 25 rows of the holes are formed in the width direction and a hole spacing is 20×20 mm. The number of the chipping discharging holes (2-04) is 7.

Further, the fixture integration platform, the split bench vise, the flexible fixture element, the first fixture pallet and the second fixture pallet can be rigidly located and locked on the multifunctional machine tool countertop.

Further, locating and receiving sleeves and locking and receiving sleeves are arranged on an upper surface of the multifunctional machine tool countertop and are used for locating and locking the first fixture pallet and the second fixture pallet.

Further, the first fixture pallet and the second fixture pallet are foundation plates of perforated structures. Various fixture combinations can be assembled on surfaces of the first fixture pallet and the second fixture pallet, and are used for clamping parts. The sizes of the first fixture pallet and the second fixture pallet are selected based on the sizes of the machined parts. And when multiple identical parts are machined necessarily, the parts can be clamped to the first fixture pallet or the second fixture pallet in advance, so that rapid switching can be achieved during machining to improve the efficiency and the service efficiency of the machine tool.

Further, first locating balls and second locating balls are arranged on bottom surfaces of the first fixture pallet and the second fixture pallet respectively, and the first locating balls and the second locating balls are matched with the locating and receiving sleeves on the multifunctional machine tool countertop.

Further, 4 first tapered locks are arranged at four corners at the periphery of the first fixture pallet, and 4 second tapered locks are arranged at four corners at the periphery of the second fixture pallet. The first tapered locks and the second tapered locks are matched with the locking and receiving sleeves on the multifunctional machine tool countertop. And after the first tapered locks or the second tapered locks, and the locking and receiving sleeves are locked, the first fixture pallet or the second fixture pallet can be locked on the multifunctional machine tool countertop.

Further, when the first fixture pallet and the second fixture pallet clamp the parts, cushion blocks in appropriate thicknesses can be applied below an end face parallel to a center connection line between the locating balls to ensure stable placement of pallet surfaces of the fixture pallets.

Further, no lead screw is connected between the fixed jaw and the movable jaw of each split bench vise, thus the heights of the clamped parts can be reduced.

Further, the fixed jaws and the movable jaws of the split bench vise can be located on the multifunctional machine tool countertop, or the countertop of the fixture integration platform, or the first fixture pallet, or the second fixture pallet via cylindrical pins, and then are locked by screws. The effective working range of the jaws is 0-700 mm, and within such range, the jaws can be subject to advancing and retreating adjustment by 20 mm per step according to the 20×20 mm spacing of the multifunctional machine tool countertop, and the movable jaws can be subject to stepless adjustment within the range of 0-25 mm.

Further, the split bench vise is provided with V-shaped jaws in various sizes and thus can locate and clamp square, circular and arc parts.

Further, the first adjustable bearing, the second adjustable bearing and the third adjustable bearing combined randomly are arranged on the flexible fixture element. The flexible fixture element can clamp special-shaped parts having surface location, edge location, arc location, hole location and internal and external circle location requirements, and through combinations and changes of the first adjustable bearing, the second adjustable bearing and the third adjustable bearing, the universal fixture based machine tool has a changing function of three increment axes U, V, and W.

According to specific embodiments of the invention, the invention has the following technical effects:

The universal fixture based machine tool itself has various work fixtures and a machine tool and the work fixtures are integrated, so that the universal fixture based machine tool is formed. The universal fixture based machine tool has three moving axes X, Y and Z, three rotating axes A, B and C, and three increment axes U, V and W, a total of nine axes. The universal fixture based machine tool is mainly used for turning, milling and drilling, and can complete two-dimensional and three-dimensional space position machining except curved surface manufacturing.

The work fixtures of the universal fixture based machine tool can replace special fixtures completely and can be assembled simply within tens of minutes, while the manufacturing time of special fixtures of the same kind is 1-2 months generally.

The configuration of work fixtures of the universal fixture based machine tool can be recycled.

BRIEF DESCRIPTION OF THE DRAWINGS

In order to more clearly describe the embodiments of the invention or the technical scheme in the prior art, the drawings to be used in the embodiments will be simply introduced as follows. Apparently, the drawings described below are only some embodiments of the invention. Those of ordinary skill in the art can obtain other drawings based on these drawings without creative work.

Figure 1:
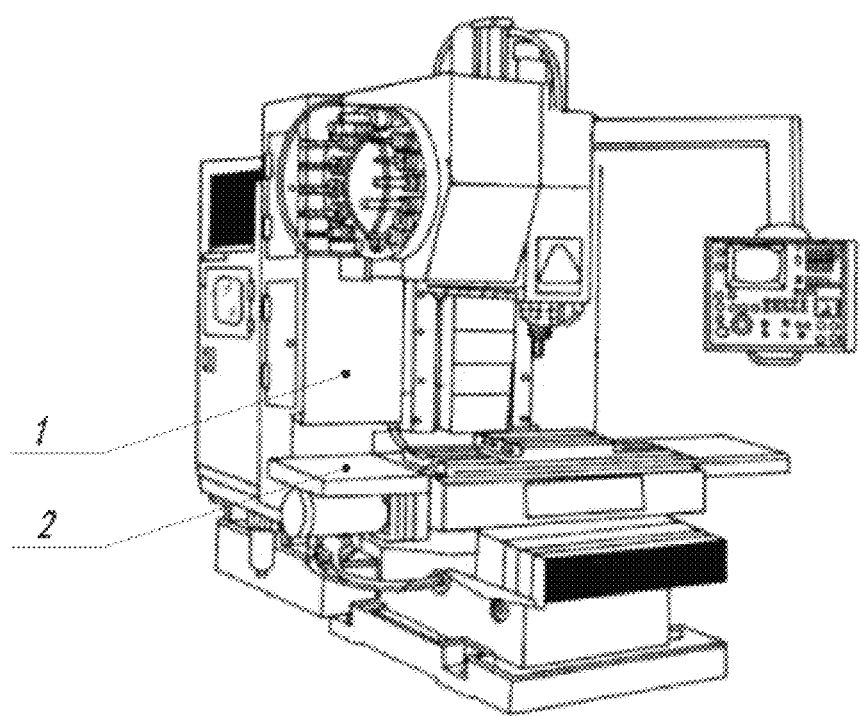
FIG. 1 is a structural diagram of a three-axis linkage numerically-controlled machine tool body.

In the drawings: 1. three-axis linkage numerically-controlled machine tool body; 2. multifunctional machine tool countertop; 2-01. locking and receiving sleeve; 2-02. locating and receiving sleeve; 2-03. hole; 2-04. chipping discharging hole; 3. first fixture pallet; 3-01. first locating ball; 3-02. first tapered lock; 4. second fixture pallet; 4-01. second locating ball; 4-02. second tapered lock; 5. fixture integration platform; 5-01. fixture integration platform rotating handle; 5-02. countertop; 5-03. angle electronic display; 5-04. angle adjustment rod handle; 5-05. angle adjustment rod; 5-06. center axis hole; 5-07. rotary supporting rod; 5-08. hinge shaft; 5-09. worm handle; 5-10. locking device; 5-11. rotary upper platen; 5-12. rotary lower platen; 5-13. nut lantern ring; 6. split bench vise; 6-01. fixed jaw; 6-02. movable jaw; 7. flexible fixture element; 7-01. first adjustable bearing; 7-02. second adjustable bearing; 7-03. third adjustable bearing.

DETAILED DESCRIPTION OF THE PRESENT INVENTION

Figure 2:
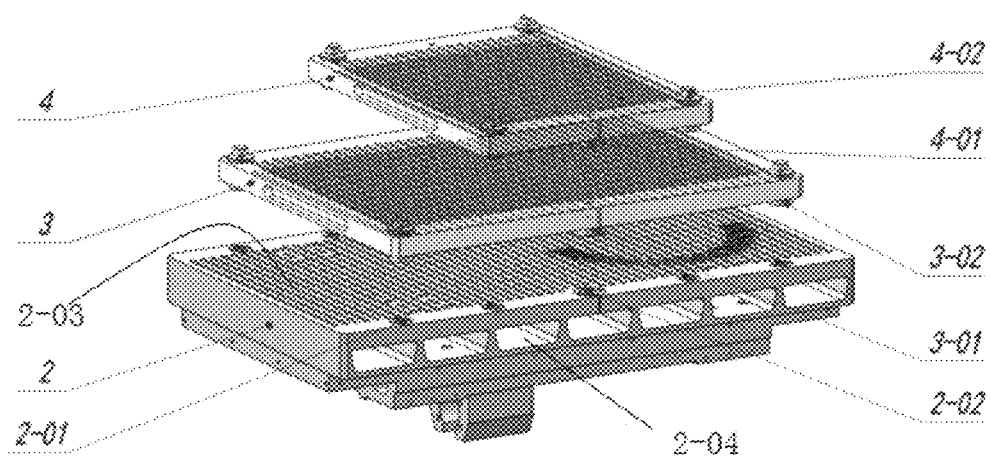
FIG. 2 is a structural diagram of a multifunctional machine tool countertop and a fixture pallet.
Figure 3:
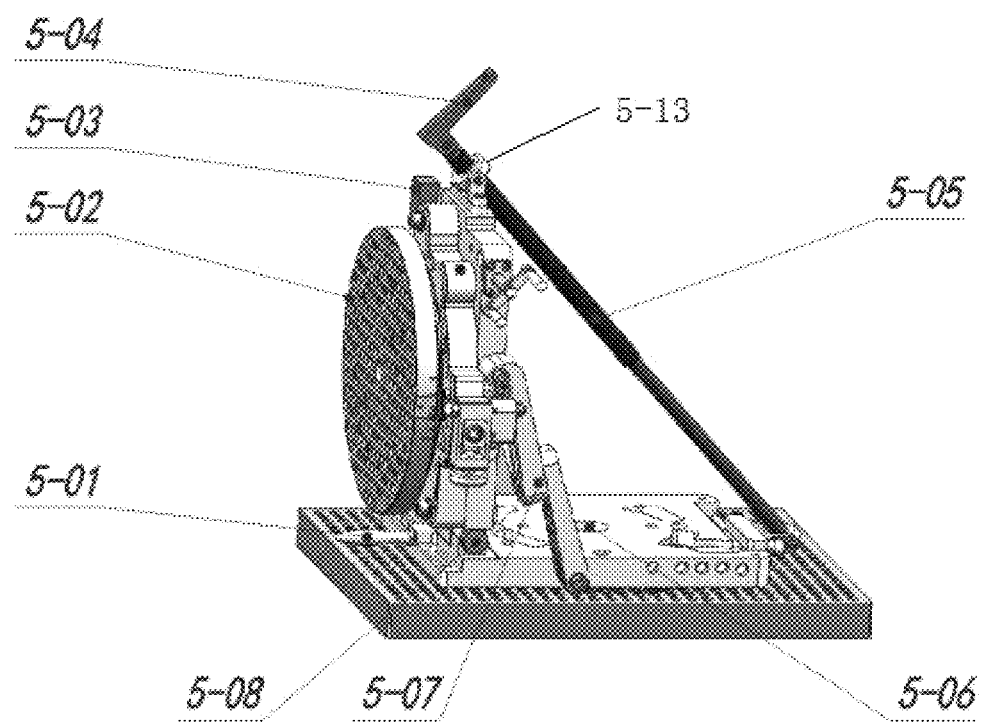
FIG. 3 is a structural diagram of a fixture integration platform.
Figure 4:
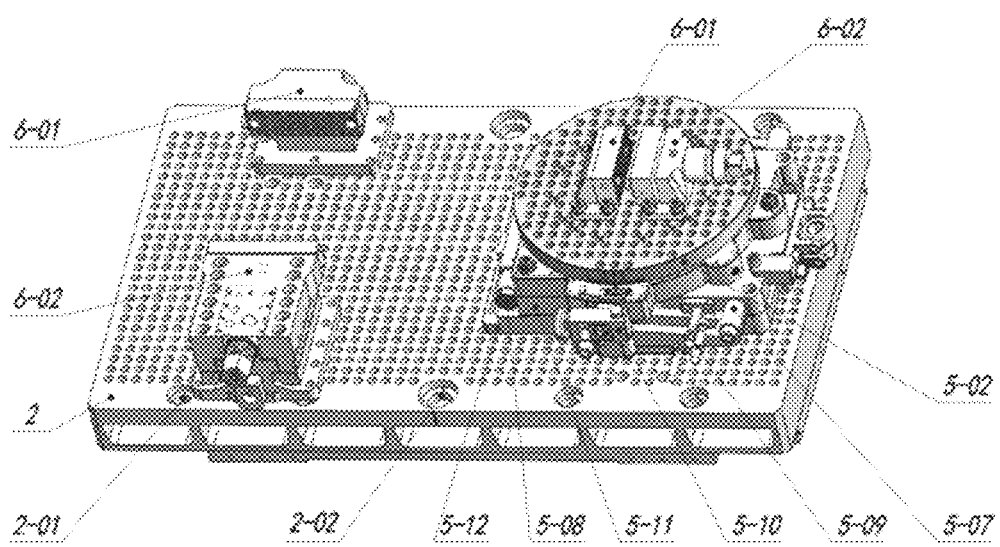
FIG. 4 is a structural diagram of split bench vise.
Figure 5:
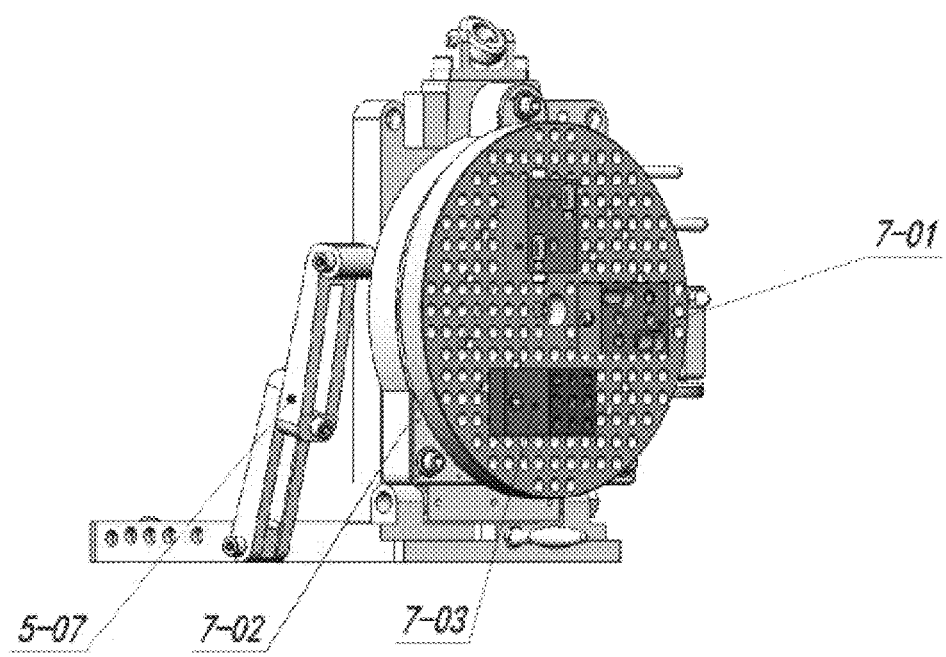
FIG. 5 is a structural diagram of a flexible fixture element.

As shown in FIG. 1 to FIG. 5, the invention provides a universal fixture based machine tool used in the machining industry, including: a three-axis linkage numerically-controlled machine tool body (1), a multifunctional machine tool countertop (2), a first fixture pallet (3), a second fixture pallet (4), a fixture integration platform (5), a split bench vise (6) and a flexible fixture element (7). The multifunctional machine tool countertop (2) is arranged on the numerically-controlled machine tool body (1). The first fixture pallet (3) or the second fixture pallet (4) is arranged on the multifunctional machine tool countertop (2). The fixture integration platform (5), and the split bench vise (6) or the flexible fixture element (7) is arranged on the first fixture pallet (3) or the second fixture pallet (4). The split bench vise (6) can be arranged on the multifunctional machine tool countertop (2), the first fixture pallet (3) and the second fixture pallet (4). The split bench vise (6) or the flexible fixture element (7) can be arranged on the fixture integration platform (5). Preferably, the length and width of the first fixture pallet (3) are less than those of the multifunctional machine tool countertop (2), and the length and width of the second fixture pallet (4) are less than those of the first fixture pallet (3).

A rotary lower platen (5-12) is further arranged at the bottom of the fixture integration platform (5). A rotary upper platen (5-11) is arranged on the rotary lower platen (5-12). One side edges of the rotary lower platen (5-12) and the rotary upper platen (5-11) are rotatably connected through a hinge shaft (5-08), and an angle adjustment rod (5-05) capable of allowing the rotary upper platen (5-11) to rotate upwards around the hinge shaft (5-08) is arranged on the other side edges of the rotary lower platen (5-12) and the rotary upper platen (5-11). One end of the angle adjustment rod (5-05) is hinged with the rotary lower platen (5-12), and an angle adjustment rod handle (5-04) capable of allowing the angle adjustment rod (5-05) to rotate is arranged at the other end of the angle adjustment rod (5-05). The angle adjustment rod (5-05) is provided with threads. The rotary upper platen (5-11) is provided with a nut lantern ring (5-13) fitting with the angle adjustment rod (5-05). And the nut lantern ring (5-13) can rotate around a horizontal center line, parallel to the hinge shaft (5-08), of the nut lantern ring (5-13). Preferably, the range of angles of the rotary upper platen (5-11) rotating upwards around the hinge shaft (5-08) is 0-90 degrees, and an angle electronic display (5-03) capable of reading an upward rotating angle is arranged on the rotary upper platen (5-11). A center axis hole (5-06) is formed in a center of the rotary lower platen (5-12), and the fixture integration platform (5) is enabled to rotate around the center axis hole (5-06) by 360 degrees. A countertop (5-02) and a worm handle (5-09) are arranged on the rotary upper platen (5-11), and the countertop (5-02) is enabled to make 360-degree rotation by rotating the worm handle (5-09). A fixture integration platform rotating handle 5-01 is arranged on a side edge of the rotary lower platen (5-12) and is used as a stress point when the fixture integration platform 5 rotates or is lifted.

By rotating the angle adjustment rod handle (5-04), the angle adjustment rod 5-05 is driven to rotate. Through threaded fitting motion of the angle adjustment rod 5-05 and the nut lantern ring (5-13), the rotary upper platen (5-11) makes 0-90-degree rotation around the hinge shaft (5-08). And at the same time the nut lantern ring (5-13) rotates around a horizontal center line, parallel to the hinge shaft (5-08), of the nut lantern ring (5-13). A rotary supporting rod 5-07 supporting the rotary upper platen (5-11) in a rotating process is further arranged between the rotary upper platen (5-11) and the rotary lower platen (5-12). And a locking device 5-10 with locking and fixing effects when being folded is further arranged between the rotary upper platen (5-11) and the rotary lower platen (5-12).

The center line perpendicular to the countertop 5-02 is equivalent to an axis A, the hinge shaft is equivalent to an axis B, the center axis hole is equivalent to an axis C, and when the three rotating axes A, B and C are linked, a composite space angular variation function can be obtained.

The numerically-controlled machine tool body of the universal fixture based machine tool is a three-axis linkage numerically-controlled machining center machine tool body of which the X axis, Y axis and Z axis are 1000 mm, 600 mm and 500 mm in travel respectively, with the precision being 0.01 mm and a tool magazine including 10 tools. A three-axis linkage machining function of X-, Y-, and Z-coordinate moving axes can be achieved.

The multifunctional machine tool countertop 2 is of a foundation plate structure of a perforated fixture and is 1000 mm in length and 600 mm in width. 48 rows of the holes 2-03 are formed in the length direction and 25 rows of the holes 2-03 are formed in the width direction. A hole spacing in the length and width directions is 20×20 mm. Upper half portions of the holes 2-03 are cylindrical pin holes which are 13 mm in diameter, and the cylindrical pin holes can be used for locating various work fixtures on the machine tool table. Lower half portions of the holes 2-03 are M12 screw holes which are used for fixing and locking the work fixtures on the machine tool table. The fixture integration platform 5, the split bench vise 6, the flexible fixture element 7, the first fixture pallet 3 and the second fixture pallet 4 can be rigidly located and locked on the multifunctional machine tool countertop 2. 2 locating and receiving sleeves 2-02 and 8 locking and receiving sleeves 2-01 are arranged on an upper surface of the multifunctional machine tool countertop 2 and are used for locating and locking the first fixture pallet 3 and the second fixture pallet 4. The first fixture pallet 3 and the second fixture pallet 4 are foundation plates of perforated structures. Various flexible fixture combinations can be assembled on surfaces of the first fixture pallet 3 and the second fixture pallet 4 and are used for clamping parts. The sizes of the first fixture pallet 3 and the second fixture pallet 4 are selected based on the sizes of the machined parts. And when multiple identical parts are machined necessarily, the parts can be clamped to the first fixture pallet 3 or the second fixture pallet 4 in advance, so that rapid switching can be achieved during machining to improve the efficiency and the service efficiency of the machine tool. 2 first locating balls 3-01 are arranged on a bottom surface of the first fixture pallet 3, and 2 second locating balls 4-01 are arranged on a bottom surface of the second fixture pallet 4. The first locating balls 3-01 and the second locating balls 4-01 are matched with the locating and receiving sleeves 2-02 on the multifunctional machine tool countertop 2.

4 first tapered locks 3-02 are arranged at four corners at the periphery of the first fixture pallet 3, and 4 second tapered locks 4-02 are arranged at four corners at the periphery of the second fixture pallet 4. The first tapered locks 3-02 and the second tapered locks 4-02 are matched with the locking and receiving sleeves 2-01 on the multifunctional machine tool countertop 2. After the first tapered locks 3-02 or the second tapered locks 4-02, and the locking and receiving sleeves 2-01 are locked, the first fixture pallet 3 or the second fixture pallet 4 can be locked on the multifunctional machine tool countertop 2. When the first fixture pallet 3 or the second fixture pallet 4 clamps the part, a cushion block having an appropriate thickness can be applied to a place below an end face parallel to a center connection line between the first locating balls 3-01 or the second locating balls 4-01 to ensure stable placement of a pallet surface of the first fixture pallet 3 or the second fixture pallet 4. The fixture integration platform 5 is a multifunctional work fixture and can achieve a rotary machining function of three rotation axes A, B, and C of the universal fixture based machine tool.

By rotating the worm handle 5-09 of a worm gearbox, the countertop 5-02 of the fixture integration platform 5 can make 360-degree rotation, so as to achieve a rotating changing function of the axis A. By rotating the angle adjustment rod handle 5-04 of the rotary upper platen 5-11, the countertop 5-02 of the fixture integration platform 5 can make 0-90-degree rotation around the hinge shaft 5-08 so as to achieve the rotating changing function of the axis B, and the change of the angle can be directly read by the angle electronic display 5-03. When the fixture integration platform 5 makes 360-degree rotation around the center axis hole 5-06 of the rotary lower platen 5-12, the rotating changing function of the axis C can be achieved. And when the three rotating axes A, B and C are linked, composite space angular change of the parts can be obtained.

The fixed jaws 6-01 and the movable jaws 6-02 of the split bench vise 6 can be located on the multifunctional machine tool countertop 2, or the fixture integration platform 5, or the first fixture pallet 3, or the second fixture pallet 4 via cylindrical pins, and then are locked by screws. The effective working range of the jaws of the split bench vise 6 is 0-700 mm. Within such range, the movable jaws 6-02 can be subject to advancing and retreating adjustment by 20 mm per step according to the 20×20 mm spacing of the multifunctional machine tool countertop, and the movable jaws 6-02 can be subject to stepless adjustment within the range of 0-25 mm. The split bench vise 6 is provided with V-shaped jaws in various sizes and thus can locate and clamp square, circular and arc parts. And since no lead screw is connected between the fixed jaw 6-01 and the movable jaw 6-02 of each split bench vise, the heights of the clamped parts can be reduced.

The flexible fixture element 7 can clamp special-shaped parts having requirements for surface location, edge location, arc location, hole location, and internal and external circle location, and the universal fixture based machine tool has a changing function of three increment axes U, V, and W by combinations and changes of the first adjustable bearing, the second adjustable bearing and the third adjustable bearing.

Working Principle:

The multifunctional machine tool countertop 2, the first fixture pallet 3, the second fixture pallet 4 and the countertop 5-02 of the fixture integration platform 5 are all of perforated foundation plates, and by taking any hole (axis) on the countertop of the universal fixture based machine tool as an origin of coordinates, locating references of a point, a line, a surface, a hole, an arc and a circle are adjusted on the three increment axes U, V and W at 0.01 mm differential, so as to meet the overall locating requirement of the special-shaped workpiece for firmly clamping the workpiece.

The clamped workpiece is subject to 10" differential step rotation through the three rotating axes A, B and C and is located in a two-dimensional or a three-dimensional spatial position The most precise cutting position of the workpiece is located and machined through 0.01 mm differential linkage adjustment of three moving axes X, Y and Z of the three-axis numerically-controlled machine tool by a cutting tool.

The specific examples are applied in the invention to illustrate the principle and embodiments of the invention, and the embodiments described above are only used to aid in the understanding of a method and the concept of the invention. In addition, it should be understood by those skilled in the art that both the specific embodiments and the application range may be changed according to the thought of the invention. In conclusion, the content of the description should not be considered as limiting to the invention.

What is claimed is:

1. A universal fixture based machine tool, comprising: a three-axis linkage numerically-controlled machine tool body (1), a multifunctional machine tool countertop (2), a first fixture pallet (3), a second fixture pallet (4), a fixture integration platform (5), a split bench vise (6) and a flexible fixture element (7), wherein the multifunctional machine tool countertop (2) is arranged on the numerically-controlled machine tool body (1); the first fixture pallet (3) and/or the second fixture pallet (4) are/is arranged on the multifunctional machine tool countertop (2); the fixture integration platform (5) and the split bench vise (6) are arranged on the multifunctional machine tool countertop (2), or the first fixture pallet (3), or the second fixture pallet (4); and the split bench vise (6) and/or the flexible fixture element (7) are/is arranged on the fixture integration platform (5).

2. The universal fixture based machine tool of claim 1, wherein a rotary lower platen (5-12) is further arranged at the bottom of the fixture integration platform (5); a rotary upper platen (5-11) is arranged on the rotary lower platen (5-12); one side edges of the rotary lower platen (5-12) and the rotary upper platen (5-11) are rotatably connected through a hinge shaft (5-08); and an angle adjustment rod (5-05) capable of allowing the rotary upper platen (5-11) to rotate upwards around the hinge shaft (5-08) is arranged on the other side edges of the rotary lower platen (5-12) and the rotary upper platen (5-11).

3. The universal fixture based machine tool of claim 2, wherein one end of the angle adjustment rod (5-05) is hinged with the rotary lower platen (5-12); an angle adjustment rod handle (5-04) capable of allowing the angle adjustment rod (5-05) to rotate is arranged at the other end of the angle adjustment rod (5-05); the angle adjustment rod (5-05) is provided with threads; the rotary upper platen (5-11) is provided with a nut lantern ring (5-13) fitting with the angle adjustment rod (5-05); and the nut lantern ring (5-13) can rotate around a horizontal center line, parallel to the hinge shaft (5-08), of the nut lantern ring (5-13).

4. The universal fixture based machine tool of claim 2, wherein the range of angles of the rotary upper platen (5-11) rotating upwards around the hinge shaft (5-08) is 0-90 degrees.

5. The universal fixture based machine tool of claim 2, wherein an angle electronic display (5-03) capable of reading an upward rotating angle is arranged on the rotary upper platen (5-11).

6. The universal fixture based machine tool of claim 2, wherein a center axis hole (5-06) is formed in a center of the rotary lower platen (5-12), and the fixture integration platform (5) is enabled to rotate around the center axis hole (5-06) by 360 degrees.

7. The universal fixture based machine tool of claim 2, wherein a countertop (5-02) and a worm handle (5-09) are arranged on the rotary upper platen (5-11), and the countertop (5-02) is enabled to make 360-degree rotation by rotating the worm handle (5-09).

8. The universal fixture based machine tool of claim 1, wherein the numerically-controlled machine tool body (1) is a numerically-controlled three-coordinate axis machine tool, and the X axis, Y axis and Z axis are 1000 mm, 600 mm and 500 mm in travel respectively, with the precision being 0.01 mm.

9. The universal fixture based machine tool of claim 1, wherein the multifunctional machine tool countertop (2) is provided with holes (2-03) for locking fixtures; upper half portions of the holes (2-03) are cylindrical pin holes; lower half portions of the holes (2-03) are screw holes; the multifunctional machine tool countertop (2) is of a two-layer structure; and chipping discharging holes (2-04) perforated in the width direction are formed in a lower layer in the length direction.

10. The universal fixture based machine tool of claim 9, wherein the multifunctional machine tool countertop (2) is of a foundation plate structure and is 1000 mm in length and 600 mm in width; 48 rows of the holes are formed in the length direction; 25 rows of the holes are formed in the width direction; a hole spacing is 20 mm; and the number of the chipping discharging holes (2-04) is 7.

11. The universal fixture based machine tool of claim 1, wherein the first fixture pallet (3), the second fixture pallet (4), the fixture integration platform (5), the split bench vise (6) and the flexible fixture element (7) are rigidly located and locked on the multifunctional machine tool countertop (2).

12. The universal fixture based machine tool of claim 1, wherein locating and receiving sleeves (2-02) and locking and receiving sleeves (2-01) are arranged on an upper surface of the multifunctional machine tool countertop (2).

13. The universal fixture based machine tool of claim 1, wherein the first fixture pallet (3) and the second fixture pallet (4) are foundation plates of perforated structures; and various fixture combinations can be assembled on surfaces of the first fixture pallet (3) and the second fixture pallet (4).

14. The universal fixture based machine tool of claim 12, wherein first locating balls (3-01) and second locating balls (4-01) are arranged on bottom surfaces of the first fixture pallet (3) and the second fixture pallet (4) respectively; and the first locating balls (3-01) and the second locating balls (4-01) are matched with the locating and receiving sleeves (2-02) on the multifunctional machine tool countertop (2).

15. The universal fixture based machine tool of claim 12, wherein 4 first tapered locks (3-02) are arranged at four corners at the periphery of the first fixture pallet (3); 4 second tapered locks (4-02) are arranged at four corners at the periphery of the second fixture pallet (4); and the first tapered locks (3-02) and the second tapered locks (4-02) are matched with the locking and receiving sleeves (2-01) on the multifunctional machine tool countertop (2).

16. The universal fixture based machine tool of claim 1, wherein the split bench vise (6) is provided with V-shaped jaws in various sizes.

17. The universal fixture based machine tool of claim 1, wherein the split bench vise (6) comprises a fixed jaw (6-01) and a movable jaw (6-02), and no lead screw is connected between the fixed jaw (6-01) and the movable jaw (6-02).

18. The universal fixture based machine tool of claim 1, wherein a first adjustable bearing (7-01), a second adjustable bearing (7-02) and a third adjustable bearing (7-03) combined randomly are arranged on the flexible fixture element (7).

\* \* \* \* \*